Feb. 14, 1956 J. B. DYER ET AL 2,735,029
MOTOR CONTROL MEANS
Filed April 6, 1953
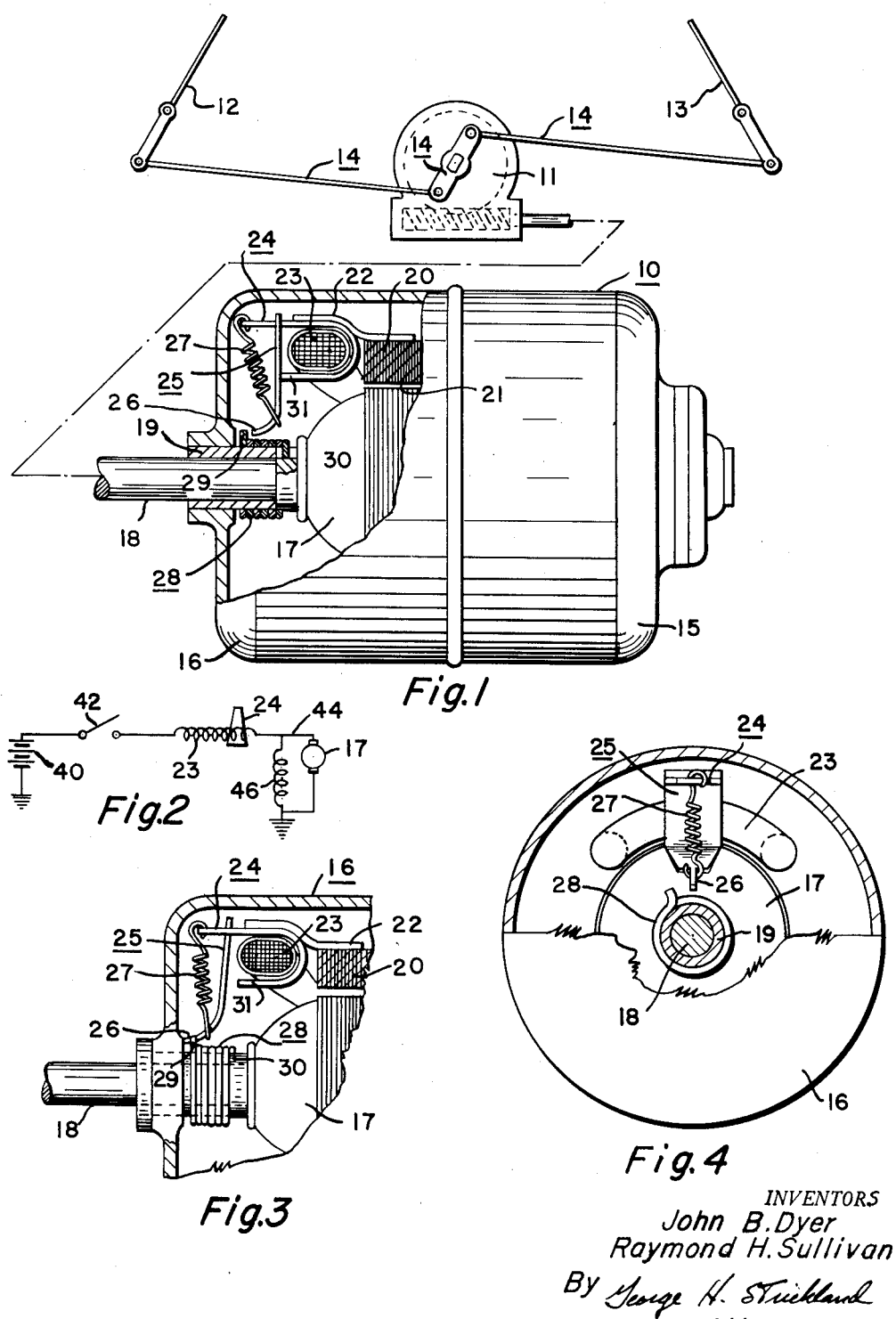
INVENTORS
John B. Dyer
Raymond H. Sullivan
By George H. Strickland
Attorney United States Patent Office 2,735,029
Patented Feb. 14, 1956

2,735,029

MOTOR CONTROL MEANS

John B. Dyer, Syracuse, and Raymond H. Sullivan, Rochester, N. Y., assignors to General Motors Corporation, Detroit, Mich., a corporation of Delaware Application April 6, 1953, Serial No. 347,024

10 Claims. (Cl. 310—77)

The present invention relates to motor control means, and more particularly to means for controlling the operation of an electric motor.

Precise control of an electric motor is oftentimes necessary. However, the extent to which control characteristic of electric motors are relegated to items of secondary importance in favor of economy, is somewhat startling. This invention pertains to novel means for decelerating electric motors substantially instantaneously, whereby a high speed motor may be brought to standstill within a relatively few revolutions. One of the more salient features of the instant invention is to accomplish the aforesaid control without appreciably increasing the production cost of an electric motor. Accordingly, among my objects are the provision of means for decelerating a motor; the further provision of deceleration means operable automatically upon opening of the energizing circuit of an electric motor; and the still further provision of motor decelerating means actuated in response to the collapse of magnetic flux in the series field coil of a D. C. motor.

The aforementioned and other objects are accomplished in the present invention by employing a spring operated, electromagnetically released actuator for achieving control of electric motor deceleration. Specifically, the magnetic force for releasing the actuator is derived from the normally unused, end turns of the series field coil of a D. C. motor. However, the illustrated embodiment utilizing the end turns of the series field coil is only by way of example, and not by way of limitation, as it is readily apparent that other means could be devised within the scope of this invention for achieving the desired motor control. Moreover, the disclosed means could be employed to decelerate an A. C. motor.

In this invention deceleration, or arresting rotation of the armature, is effected by means of an L. G. S. spring, that is, a precision spring made to exacting dimensions as is well known in the art. One end of the L. G. S. spring is secured to the motor shaft, and the other end is guided by a stationary bearing such that during armature rotation, the spring normally rotates therewith. The free end of the spring is constructed and arranged to be engaged by an abutment, and when the free end is so engaged, the spring is immediately tightened on its bearing to thereby effect rapid deceleration of the armature shaft. The abutment forms component parts of the spring operated, electromagnetically released, actuator heretofore alluded to. The actuator includes a yoke member, which is supported to embrace a portion of the end turns of the series field coil of an electric motor such that upon flow of current through the series field coil, magnetic flux produced thereby will magnetize the yoke. An armature constituting the abutment heretofore mentioned, is pivotally supported on the yoke so as to be attracted thereby when the latter is magnetized. The yoke also supports one end of a coiled compression spring, the other end of the spring being attached to the armature so that upon cessation of current flow through the series field coil, and the substantially instantaneous collapse of the magnetic flux, the spring will move the armature away from the yoke, thus, positioning the abutment portion thereof in alignment with the free end of the L. G. S. spring.

Further objects and advantages of the present invention will be apparent from the following description, reference being had to the accompanying drawings wherein a preferred embodiment of the present invention is clearly shown.

In the drawing:

Fig. 1 is a composite view illustrating an application of this invention, the motor being partly in section and partly in elevation.

Fig. 2 is a circuit diagram of the motor energizing circuit.

Fig. 3 is a fragmentary view of the motor showing the spring operated, electromagnetically released actuator in the operative position.

Fig. 4 is an end view of a motor constructed according to this invention, partly in section and partly in elevation.

With reference to Fig. 1, a motor 10 constructed according to this invention is depicted as actuating motion converting mechanism 11 for driving a pair of windshield wiper blades 12 and 13 through transmission means 14. Although this invention has particular application for actuating power driven windshield wipers, it is to be understood that the invention is capable of much broader application. Instantaneous deceleration of the motor shaft from high speed rotation to a standstill is oftentimes desirable. This is particularly true where coasting of a motor after deenergization is disadvantageous, as it is in the case of windshield wiper actuating mechanisms wherein the blades are to be parked in a predetermined position upon motor deenergization. This invention obviates the problems caused by erratic motor coasting in a very simple but effective manner.

The electric motor 10 includes the normal end caps 15 and 16, which are united to form the motor housing. Disposed within the housing is an armature 17 having a shaft 18, which is journaled for rotation in bearings supported in the end cap members 15 and 16. One of the bearings is indicated at 19 in Fig. 1, the bearing being of the plain type which is rigidly attached to end cap 16. Likewise, supported in the motor housing by any suitable means, not shown, is a stator 20, or magnetic pole piece, which cooperates with the armature 17 to provide the conventional air gap 21 for the magnetic circuit. Attached to the laminated stator 20 by a welding, is a member 22. A field coil 23 is wound around the laminated stator 20 in a conventional fashion, the end turns of the field coil being shown in Fig. 1. In this instance the field coil 23 is electrically connected in series with the armature 17 for a reason which will later be apparent. The motor 10 may also be provided with a shunt field winding, which is not shown in Fig. 1, as well as the usual brushes and brush rigging necessary to construct a compound wound D. C. electric motor.

The member 22 supports a yoke member 24, which is composed of magnetic material, the yoke member embracing a portion of the end turns of the field coil 23. One arm of the yoke 24 pivotally supports an armature element 25 having a hooked end 26 forming an abutment. The arm of the yoke 24, which pivotally supports the armature 25, also provides support for one end of a compression spring 27, the other end of which is attached to the armature 25 adjacent the hooked end 26 thereof.

An L. G. S. spring 28 encompasses a portion of the plain bearing 19, one end of the spring 28 having an upturned end 29, which is located in contiguous relation to the hooked end 26 of the armature 25. The L. G. S. spring consitutes a brake or arresting device, and is helically wound. The other end 30 of the spring 28 is suitably secured to the motor shaft 18, in this instance the end 30 being disposed in a slotted portion of the motor shaft 18 and suitably secured thereto. When the current is flowing through the field coil 23, the magnetic flux produced thereby magnetizes the yoke 24 which, in turn, attracts the armature 25 and retains the armature in contact with the free end 31 of the yoke against the thrust of the spring 27, as is shown in Fig. 1. However, upon cessation of current flow through the field coil 23, and the consequent collapse of the magnetic flux, the spring 27 will move the armature 25 about its pivotal connection with the yoke 24 so that the hooked end 26 thereof contacts the inner wall of the end cap 16, in which position the hooked end 26 forms an abutment for engaging the free end 29 of the L. G. S. spring 28.

With particular reference to Fig. 2, a typical energizing circuit for the motor 10 will now be described. The energizing circuit includes a battery 40, one terminal of which is connected to ground and the other terminal of which is connected by wire through a manually actuable switch 42 and, thence, to one terminal of the series field coil 23. The end turns of the series field coil 23 are depicted in Fig. 2 as being embraced by the magnetic yoke 24. The other terminal of the series field coil 23 is connected by a wire 44 to one side of the armature 17, the other side of which is connected to ground. The wire 44 also has electrical connection with one end of a shunt field coil 46, the other end thereof being connected to ground. It will be readily apparent to those skilled in the art that upon closure of the switch 42, current will flow through both the series field coil 23 and the shunt field coil 46, as well as through the armature 17. Magnetic flux produced by the series and shunt field coils will, in turn, effect rotation of the armature 17. Upon opening of the switch 42, current flow through the series field coil 23 will be interrupted and the magnetic flux produced thereby will collapse substantially instantaneously. However, the same will not be true in the shunt field coil 46, as while the armature 17 is rotating, a regenerative effect will ensue causing a voltage to be developed across the shunt field coil 46, which produces a current flow through the armature and the shunt field coil, thus precluding the instantaneous collapse of magnetic flux about the shunt field coil. This generator effect is well recognized, and mention thereof is made here only to point out that the electromagnetically released actuator would not work effectively if the yoke 24 embraced the end turns of the shunt field winding.

*Operation*

The operation of the arresting device is as follows. Upon closure of the switch 42, the motor 10 will be energized and the magnetic flux produced by the end turns of series field coil 23 will energize the yoke 24 and thereby move the armature 25 to the position shown in Fig. 1. In this instance the hooked end 26 of the armature is moved out of alignment with the upturned end 29 of the L. G. S. spring 28 and, accordingly, upon rotation of the armature 17, the spring 28 will rotate freely therewith on the bearing 19. However, upon opening of the switch 42, current flow through the series field winding 23 will be interrupted instantaneously. Instantaneous interruption of the current flow of the series field 23 will result in an instantaneous collapse of the magnetic flux produced by the field coil 23, which, in turn, deenergizes the magnetic yoke 24 and permits the spring 27 to move the armature 25 and the hooked end 26 thereof to the position shown in Fig. 3. Accordingly, during the next revolution of the armature shaft 18, the hooked end 26 will engage the upturned end 29 of the L. G. S. spring and continued rotation of the armature shaft will wind up, or torsionally energize the spring 28, such that the spring binds on the bearing 19 and arrests rotation of the motor shaft 18 on the armature 17. It has been found that rotation of the armature 17 can be completely arrested, that is, brought to a standstill, within a very few revolutions by employing an L. G. S. spring type brake, as herein disclosed. Moreover, by associating the magnetic actuator with the end turns of the series field coil, the arresting device will become operative substantially instantaneously with the interruption of coil flow through the series field winding 23.

From the foregoing, it is apparent that the present invention provides a feasible and economical way of obtaining precise motor control. That is, a motor shaft revolving at high speed can be decelerated to a standstill substantially instantaneously with the deenergization of the series field coil. Moreover, it has been found that linking the yoke with the end turns of the series field coil does not detract from the operation of the motor, since the end turns of the field coil perform no useful function in the magnetic circuit of a D. C. motor. Moreover, the ampere turns of the field coil need not be altered to effect the required magnetic energization of the yoke. It is further apparent that the construction disclosed is very compact and can be readily embodied in a production motor with little or no change in the physical size thereof.

In the aforegoing description by L. G. S. springs, we mean springs which are ground inside and outside and in which a few of the end turns may be slightly notched to increase the flexibility.

While the embodiment of the present invention is herein disclosed, constitutes a preferred form, it is to be understood that other forms might be adopted.

What is claimed is as follows:

1. Means for decelerating an electric motor including, an armature having a shaft and a coil through which current flows during motor energization and about which the magnetic flux produced by the flow of current therethrough collapses substantially instantaneously upon deenergization of the motor, comprising in combination, brake means for said shaft including a helically wound spring having one end attached to said shaft and having an upturned portion at the other end, and means to actuate said brake means by engaging said upturned portion of said other spring end for decelerating said armature shaft substantially instantaneously with the cessation of current flow through said coil and in response to the collapse of the magnetic flux produced by current flowing through said coil.

2. Means for decelerating an electric motor including, an armature having a shaft and a coil through which current flows during motor energization and about which the magnetic flux produced by the flow of current therethrough collapses substantially instantaneously upon deenergization of the motor, comprising in combination, brake means for said shaft including a helically wound spring having one end attached to said shaft and having an upturned portion at the other end, magnetically actuated means operatively associated with said brake means for releasing said brake means by releasing the upturned portion of the other end of said spring during energization of said motor, and means operatively associated with said brake means and operable instantaneously with the collapse of magnetic flux produced by said coil upon cessation of current flow therethrough for actuating said brake means by engaging the upturned portion of the other end of said spring to decelerate said motor shaft momentarily after interruption of current flow through said coil.

3. The combination set forth in claim 8 wherein the means to actuate said brake means upon the interruption of current flow through said coil comprises a spring, opposite ends of which are attached to said member and said armature such that upon collapse of magnetic flux produced by said coil due to interruption of current flow therethrough, said spring will move said armature to a brake means actuating position.

4. In an electric motor having a series field coil and an armature, the combination of means to decelerate armature rotation comprising, a member magnetically associated with said series coil so as to be magnetized by the flow of current therethrough, an element coacting with said member so as to be magnetically attracted thereto, resilient means operatively associated with said element and effective to move the said element away from the said member upon cessation of current flow through said coil, and spring means operatively associated with said armature and engageable with the said element when it is moved away from the said member for effecting substantially instantaneous deceleration of the said armature upon cessation of current flow through said coil.

5. In an electric motor having a series field coil and an armature, the combination of means to arrest rotation of the armature including, a member magnetically associated with said series coil so as to be magnetically energized by the flow of current therethrough, an element coacting with said member so as to be magnetically attracted thereto, resilient means operatively associated with said element and effective to move the said element away from the said member upon cessation of current flow through said coil, and spring brake means operatively associated with said armature shaft and actuated by engagement with the said element when the said element is moved away from the said member upon cessation of current flow through said coil to thereby arrest rotation of said armature substantially instantaneously with the cessation of current flow through said coil.

6. Means for decelerating an electric motor including an armature having a shaft and a coil through which current flows during motor energization and about which the magnetic flux produced by the flow of current therethrough collapses substantially instantaneously upon deenergization of the motor, comprising in combination, brake means operatively associated with said armature shaft, magnetically actuated means operatively associated with said brake means for releasing said brake means during energization of said motor, said brake means comprising, a helically wound spring having one end attached to said motor shaft and having an upturned end engageable with a nonrotatable abutment upon cessation of current flow through said coil, and means operatively associated with said brake means and operable instantaneously with the collapse of magnetic flux produced by said coil upon cessation of current flow therethrough for actuating said brake means to decelerate said motor shaft momentarily after interruption of current flow through said coil.

7. Means for decelerating a D. C. electric motor including an armature having a shaft and a series field coil through which current flows during motor energization and about which the magnetic flux produced by the flow of current therethrough collapses substantially instantaneously upon motor deenergization, comprising in combination, spring brake means operatively associated with said armature shaft, magnetically actuated means operatively associated with said brake means for releasing said brake means during motor energization, and means operatively associated with said brake means and operable instantaneously with the collapse of magnetic flux produced by said coil upon cessation of current flow therethrough for actuating said brake means to decelerate said motor shaft momentarily after interruption of current flow through said coil.

8. Means for decelerating an electric motor including an armature having a shaft and a coil through which current flows during motor energization and about which the magnetic flux produced by the flow of current therethrough collapses substantially instantaneously upon motor deenergization, comprising in combination, brake means operatively associated with said armature shaft, a member partially encircling said coil so as to be magnetized by the magnetic flux produced thereby during current flow therethrough, magnetically actuated means operatively associated with said brake means for releasing said brake means during motor energization including an armature movably supported on said member and attracted thereto by the magnetic flux produced by current flow through said coil to maintain said brake means in the released position, and means operatively associated with said magnetically actuated means and operable instantaneously with the collapse of magnetic flux produced by said coil upon cessation of current flow therethrough for actuating said brake means to decelerate said motor shaft momentarily after interruption of current flow through said coil.

9. In an electric motor having a field coil and an armature, the combination of means to arrest armature rotation comprising, a member magnetically associated with said coil so as to be magnetized by the flow of current therethrough, an element coacting with said member so as to be magnetically attracted thereto, resilient means operatively associated with said element and effective to move said element away from said member upon cessation of current flow through said coil, and brake means operatively associated with said armature and engageable by said element when it is moved away from said member to arrest armature rotation substantially instantaneously with the cessation of current flow through said coil, said brake means comprising a helically wound spring having one end operatively connected to said armature and having an upturned end engageable with said element.

10. The combination set forth in claim 9 wherein said resilient means comprises a spring, opposite ends of which are attached to said member and said element such that upon the collapse of magnetic flux produced by said coil due to the interruption of current flow therethrough, said spring will move said element to a brake means actuating position.

References Cited in the file of this patent

UNITED STATES PATENTS

| | | |
|---|---|---|
| 1,437,421 | Holliday | Dec. 5, 1922 |
| 1,817,172 | Bissell | Aug. 4, 1931 |
| 2,144,416 | Nevinger | Jan. 17, 1939 |
| 2,434,480 | Anderson | Jan. 13, 1948 |
| 2,482,840 | Collins et al. | Sept. 27, 1949 |